L. S. BACON.
ANTISKIDDING DEVICE.
APPLICATION FILED OCT. 14, 1912.
1,237,274.
Patented Aug. 21, 1917.
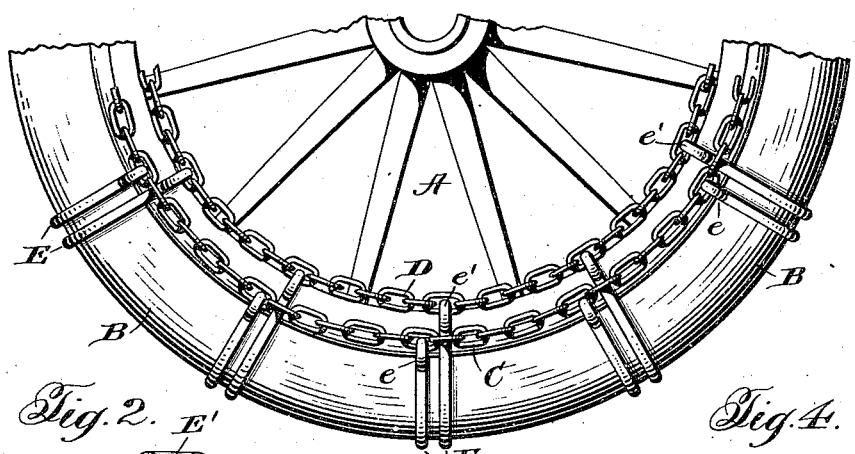
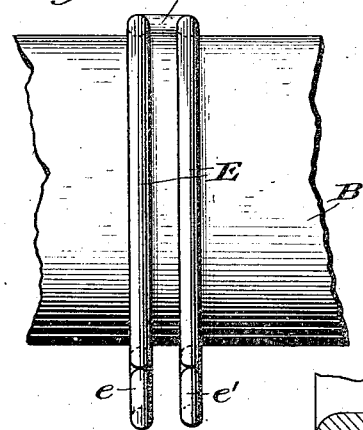
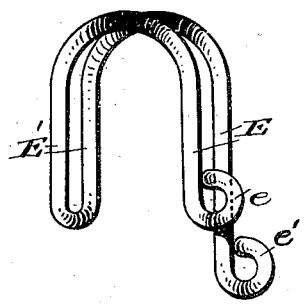
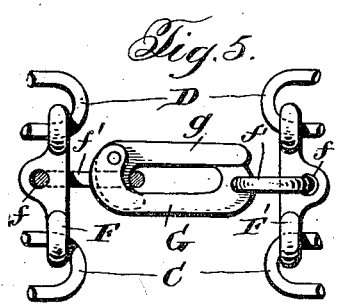
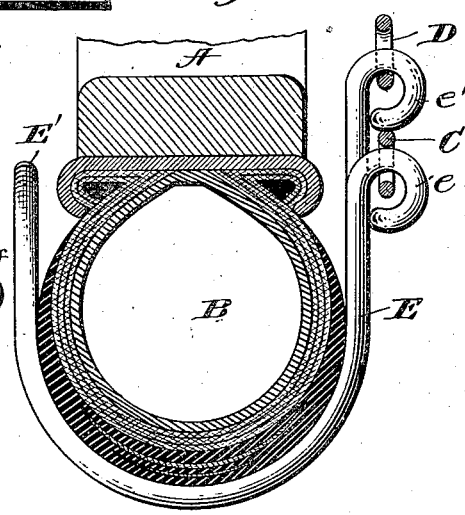
Witnesses:
Jas. E. Hutchinson
Grace A. Marvin
Inventor:
Levi S. Bacon
By Bacon & Milans Attorneys

UNITED STATES PATENT OFFICE.

LEVI SEWARD BACON, OF WASHINGTON, DISTRICT OF COLUMBIA.

ANTISKIDDING DEVICE.

1,237,274.  Specification of Letters Patent.  Patented Aug. 21, 1917.

Application filed October 14, 1912. Serial No. 725,735.

*To all whom it may concern:*

Be it known that I, LEVI SEWARD BACON, a citizen of the United States, residing at Washington, in the District of Columbia, have invented certain new and useful Improvements in Antiskidding Devices, of which the following is a specification, reference being had therein to the accompanying drawing.

This invention relates to an improvement in anti-skidding devices designed more particularly for resilient tires. The invention has to do more particularly with that type of anti-skidding devices wherein a series of metallic members are projected across the tread of the tire, the members being retained in place by suitable means, the construction permitting the removal and replacement of the device at the will of the user. Heretofore generally the more accepted type is what is now commonly termed the "Weed chain" wherein two chain members are employed, one to be located on each side of the rim or tire, cross over chains being placed at distances apart for connecting the two side chains.

The present invention comprehends the utilization of the principle of the "Weed chain" but the elimination of the necessity of having the connecting chain located on the body side of the wheel.

The invention comprises broadly the employment of a substantially rigid hook member designed and proportioned to embrace the tire with its free or bill end extended inward to a point sufficiently beyond the plane of the center of the tire to maintain the hook on the tire against accidental skewing or twisting off. I have found that in the application of the hook to the chain type of anti-skidding devices it is convenient to employ a plurality of chains, one arranged within the other and each of which is provided with a connection with a different part of the hook or cross over member. By employing a plurality of chains, conveniently two, the hooks are provided with two points of anchor or connection and therefore twisting or turning is materially resisted.

A form of anti-skidding device is shown in the accompanying drawings embodying an exceedingly simple construction, but it is to be understood that various modifications and changes can be made without departing from the nature and principle of the invention.

In the drawings:

Figure 1 is a side elevation of a portion of a wheel with the anti-skidding device applied;

Fig. 2 is a top plan showing the cross over member,

Fig. 3 is a section through the wheel showing the cross over member in elevation, Fig. 4 is a perspective view of the cross over member, and Fig. 5 is a detail of the connecting means between the chains.

A designates the tire mounted on the wheel B in any approved form. The tire is shown in this application as being of the pneumatic type. The invention, however, is not necessarily limited in its useful application to that type of tire. C, D, represent two chain members varying in length, the inner member being of a less length than the outer member. These chains are arranged so that they will assume substantially parallel relation and will be maintained in that position by the cross over members E. For convenience of illustration and as a practical embodiment of the invention, cross over members E are shown as formed of substantially rigid metal conveniently in the form of cylindrical bars of a diameter or gage approximating a quarter of an inch, more or less and the same is bent into double hooked form, the parallel portions of which are separated and carried down on the chain side of the device where they terminate in shank portions, the ends of which are looped as at $e$, $e'$, the former being located at a plane beyond the latter. This is effected by making one of the shanks of the hook longer than its companion shank. The loops $e$, $e'$ are connected respectively to links of the chains, as shown and as in the type of devices heretofore used when the hook becomes worn it is only necessary to open the loops, remove the same from the links, replacing the hooks by new ones and closing the eyes or loops over the links. This replacement can be effected by the user without material trouble or expense. The spread of the hook between the bill and the shank portions is sufficiently great to permit the hook to be easily passed over the tire with the bill E' carried down to a point approximating the plane of the loop *e*. By this arrangement both the loop *e* and the end of the hook are carried well below the center plane of the tire.

Any convenient means may be employed for connecting the opposite ends of the chains together, one form of such connection being shown in Fig. 5, two cross bars F, F' having their ends looped through the end links of the respective chains C, D, and are provided centrally with seats or apertures *f* through which suitable links *f'* are passed. Pivotally connected with the link *f'* is one member of a lever fastener and this fastener G has pivotally connected thereto a hooked lever *g*. It is to be understood that the fastener is shown somewhat diagrammatically and that any now well known or approved form of lever or other fastener may be employed. By having the cross bars *f* the tension on the two chains C, D is equalized properly although in this connection the invention is not limited to the application of a single fastener for the two chains, as pivotally independent fasteners can be employed if necessary. In applying the device it is only necessary to slip the hooks over the tire, stretching the chains so that the hooks will be in substantially proper position, and then connect the ends of the chains in any well known manner. By putting tension on the chains the hooks are held properly in their position, but at the same time the entire anti-skidding device will be permitted a slight creeping action around the rubber tire or shoe. Among the advantages of the construction shown is that of application without the necessity of moving the wheel, the avoidance of danger of the device becoming unfastened and falling into the running gear. By the loop construction of the shank parts E and E', worn hooks can be removed and new hooks applied with but little trouble and expense and the device is compact and can be readily stored in the vehicle body.

It will be observed that by employing a substantially rigid hook, and by the term "rigid" it will be understood that the hook should be of that character wherein springing or bending of the same outward is not necessary for application, a very complete anti-skidding device is produced, one having a large amount of traction surface. It is to be understood that the invention is susceptible of many modifications and changes in the form and arrangement without departing from the nature and spirit thereof.

Having thus described the invention, what is claimed as new and desired to be secured by Letters Patent is:

1. An anti-skidding device for wheels having resilient tires comprising a series of substantially rigid hook members having shank portions, of a plurality of chain members each of which is secured to the shanks of the respective hook members at different points and adapted to occupy a position when applied at one side only of the wheel and means for connecting the respective ends of the chain members.

2. An anti-skidding device for resilient tires comprising a series of substantially rigid hook members shaped to embrace the sides of a tire, each hook having a shank portion arranged to occupy a position at the same side of the wheel, a plurality of chains each of which is attached to a shank of a hook the point of attachment of the respective chains being spaced apart longitudinally of the shank, and means for connecting the ends of the chains.

3. An anti-skid device for wheels having resilient tires comprising a plurality of rigid hook members having their hook portions shaped to embrace the tire with the end of the hook projecting inwardly beyond the tire, and a shank portion, of a plurality of chain members extending from hook to hook and connected with the shanks of the hooks, one of said chain members being positioned nearer the ends of the shanks of the hooks than the other, and means for connecting the ends of the chains.

4. An anti-skidding device for resilient tires comprising a series of hook members shaped to embrace a tire, and each consisting of a bar rebent upon itself, the ends of the bar terminating in loops spaced apart longitudinally of the hook member, and two flexible members connected to the hooks at the loops with means for connecting the ends of the flexible members.

In testimony whereof I affix my signature in presence of two witnesses.

LEVI SEWARD BACON.

Witnesses:
GERTRUDE WEDEMEIER,
JAS. E. HUTCHINSON.